US011030018B2

(12) United States Patent
Battle et al.

(10) Patent No.: US 11,030,018 B2
(45) Date of Patent: Jun. 8, 2021

(54) ON-DEMAND MULTI-TIERED HANG BUSTER FOR SMT MICROPROCESSOR

(71) Applicant: International Business Machines Corporation, Armonk, NY (US)

(72) Inventors: Steven J. Battle, Austin, TX (US); Dung Q. Nguyen, Austin, TX (US); Susan E. Eisen, Round Rock, TX (US); Kenneth L. Ward, Austin, TX (US); Eula Faye Abalos Tolentino, Austin, TX (US); Cliff Kucharski, Austin, TX (US); Glenn O. Kincaid, Austin, TX (US); David S. Walder, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 307 days.

(21) Appl. No.: 15/831,658

(22) Filed: Dec. 5, 2017

(65) Prior Publication Data
US 2019/0171569 A1 Jun. 6, 2019

(51) Int. Cl.
| G06F 9/30 | (2018.01) |
| G06F 9/52 | (2006.01) |
| G06F 12/0855 | (2016.01) |
| G06F 12/0877 | (2016.01) |
| G06F 12/0895 | (2016.01) |
| G06F 12/0897 | (2016.01) |
| G06F 9/38 | (2018.01) |

(52) U.S. Cl.
CPC .......... *G06F 9/524* (2013.01); *G06F 12/0855* (2013.01); *G06F 12/0877* (2013.01); *G06F 12/0895* (2013.01); *G06F 12/0897* (2013.01); *G06F 9/38* (2013.01); *G06F 2212/40* (2013.01)

(58) Field of Classification Search
None
See application file for complete search history.

(56) References Cited

U.S. PATENT DOCUMENTS

| 6,745,321 | B1 | 6/2004 | Floyd et al. | |
| 7,010,724 | B1* | 3/2006 | Hicok | G06F 11/076 714/39 |
| 7,725,685 | B2 | 5/2010 | Floyd et al. | |
| 9,275,429 | B2* | 3/2016 | Alla | G06F 9/445 |
| 2016/0357669 | A1* | 12/2016 | Greenhalgh | G06F 9/3851 |

FOREIGN PATENT DOCUMENTS

WO 2016092344 A1 6/2016

\* cited by examiner

*Primary Examiner* — Corey S Faherty
(74) *Attorney, Agent, or Firm* — Patterson + Sheridan, LLP (57) ABSTRACT

Embodiments include systems, methods, and computer program products for using a multi-tier hang buster for detecting and breaking out of hang conditions in a processor. One method includes determining a plurality of actions available at each of a plurality of tiers used for breaking out of the hang condition in the processor. The method also includes, after detecting the hang condition on a first thread of the processor, performing one or more actions available at a first tier of the plurality of tiers to break out of the hang condition. The method further includes, after performing the one or more actions at the first tier and determining that the hang condition is still present, performing one or more actions available at one or more second tiers of the plurality of tiers to break out of the hang condition.

18 Claims, 5 Drawing Sheets

ON-DEMAND MULTI-TIERED HANG BUSTER FOR SMT MICROPROCESSOR

BACKGROUND

The present disclosure generally relates to data processing systems, and more specifically, to techniques for detecting and breaking out of a hang condition in a processing unit.

High performance processors currently used in data processing systems today may be capable of "superscalar" operation and may have "pipelined" elements. Such processors typically have multiple elements which operate in parallel to process multiple instructions in a single processing cycle. Pipelining involves processing instructions in stages, so that the pipelined stages may process a number of instructions concurrently.

In a typical first stage, referred to as an "instruction fetch" stage, an instruction is fetched from memory. Then, in a "decode" stage, the instruction is decoded into different control bits, which in general designate i) a type of functional unit (e.g., execution unit) for performing the operation specified by the instruction, ii) source operands for the operation and iii) destinations for results of operations. Next, in a "dispatch" stage, the decoded instruction is dispatched to an issue queue (ISQ) where instructions wait for data and an available execution unit. Next, in the "issue" stage, an instruction in the issue queue is issued to a unit having an execution stage. This stage processes the operation as specified by the instruction. Executing an operation specified by an instruction includes accepting one or more operands and producing one or more results.

A "completion" stage deals with program order issues that arise from concurrent execution, wherein multiple, concurrently executed instructions may deposit results in a single register. It also handles issues arising from instructions subsequent to an interrupted instruction depositing results in their destination registers. In the completion stage an instruction waits for the point at which there is no longer a possibility of an interrupt so that depositing its results will not violate the program order, at which point the instruction is considered "complete", as the term is used herein. Associated with a completion stage, there are buffers to hold execution results before results are deposited into the destination register, and buffers to backup content of registers at specified checkpoints in case an interrupt needs to revert the register content to its pre-checkpoint value. Either or both types of buffers can be employed in a particular implementation. At completion, the results of execution in the holding buffer will be deposited into the destination register and the backup buffer will be released.

While instructions for the above described processor may originally be prepared for processing in some programmed, logical sequence, it should be understood that they may be processed, in some respects, in a different sequence. However, since instructions are not totally independent of one another, complications arise. That is, the processing of one instruction may depend on a result from another instruction. For example, the processing of an instruction which follows a branch instruction will depend on the branch path chosen by the branch instruction. In another example, the processing of an instruction which reads the contents of some memory element in the processing system may depend on the result of some preceding instruction which writes to that memory element.

As these examples suggest, if one instruction is dependent on a first instruction and the instructions are to be processed concurrently or the dependent instruction is to be processed before the first instruction, an assumption must be made regarding the result produced by the first instruction. The "state" of the processor, as defined at least in part by the content of registers the processor uses for execution of instructions, may change from cycle to cycle. If an assumption used for processing an instruction proves to be incorrect then, of course, the result produced by the processing of the instruction will almost certainly be incorrect, and the processor state must recover to a state with known correct results up to the instruction for which the assumption is made. An instruction for which an assumption has been made is generally referred to as an "interruptible instruction", and the determination that an assumption is incorrect, triggering the need for the processor state to recover to a prior state, is referred to as an "interruption" or an "interrupt point". In addition to incorrect assumptions, there are other causes of such interruptions requiring recovery of the processor state. Such an interruption is generally caused by an unusual condition arising in connection with instruction execution, error, or signal external to the processor.

In speculative parallelization systems, also known as thread-level speculation (TLS) or multi-scalar systems, a compiler, runtime system, or programmer may divide the execution of a program among multiple threads, i.e. separately managed sequences of instructions that may execute in parallel with other sequences of instructions (or "threads"), with the expectation that those threads will usually be independent, meaning that no thread will write data that other threads are reading or writing concurrently. Due to the difficulty in statically determining the memory locations that will be accessed by threads at compilation time, this expectation is not always met. The parallel threads may actually make conflicting data accesses. Such parallelization systems use speculative execution to attempt to execute such threads in parallel. It is the responsibility of the system to detect when two speculative threads make conflicting data accesses, and recover from such a mis-speculation.

Each parallel thread corresponds to a segment of the original sequential code, and the parallel threads are therefore ordered with respect to one another according to their sequence in the sequential version of code. It is the responsibility of the system to ensure that the results of a speculative thread are not committed until all prior speculative threads in this sequence are known to be free of conflicts with the committing thread. Once it has been determined that the thread does not conflict with any threads in the prior sequence, and prior threads have committed, that thread may commit.

In some cases, however, during the execution of instructions, an instruction sequence may fail to execute properly or to yield the correct results for a number of different reasons. For example, a failure may occur when a certain event or sequence of events occurs in a manner not expected by the programmer. Further, a flaw in the design of a circuit or logic equation may cause an error. Due to the complexity of designing an out-of-order processor, the processor design may logically mis-process one instruction in combination with another instruction, causing an error. In some cases, a selected frequency, voltage, or type of noise may cause an error in execution because of a circuit not behaving as designed. Errors such as these often cause the scheduler in the microprocessor to "hang," resulting in execution of instructions coming to a halt.

SUMMARY

One embodiment presented herein includes a method for detecting and breaking out of hang conditions in a processor.

The method includes determining a plurality of actions available at each of a plurality of tiers used for breaking out of a hang condition in the processor. The method also includes, after detecting the hang condition on a first thread of the processor, performing one or more actions available at a first tier of the plurality of tiers to break out of the hang condition. The method further includes, after performing the one or more actions at the first tier and determining the hang condition is still present, performing one or more actions available at one or more second tiers of the plurality of tiers to break out of the hang condition.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Embodiments described herein disclose an on-demand multi-tier hang buster that can be used for early detection and breaking out of a hang condition in a processing unit (e.g., a simultaneous multi-threaded (SMT) processor).

In current processors, a SMT core can hang if critical resources are used up by one thread. In such situations, other threads may not have enough resources (e.g., mapper, issue queue, completion table entries, etc.) to make forward progress. Traditional hang detection techniques typically wait for millions of cycles to see if forward progress has been made, and if not, initiate a core flush request to attempt to flush out the threads. Once the threads are flushed, the core can resume execution of instructions (e.g., once all resources are freed). However, such traditional hang detection methods can lead to significant performance loss (e.g., if hang conditions occur frequently). Additionally, traditional hang detect methods can lead to debugging issues. For example, since it generally takes millions of cycles to detect a hang condition (e.g., with traditional hang detection methods), before the core can perform a flush request, it can be difficult to determine when and where the hang started (e.g., for debugging purposes).

Embodiments herein disclose an on-demand multi-tiered hang buster for a processing unit. As described below, the multi-tiered hang buster, which may be located in the instruction sequencing unit (ISU), can enable the ISU to detect a hang condition much earlier (e.g., on the order of thousands of cycles of not making forward progress) than traditional hang detection techniques.

To enable earlier detection of hang conditions (e.g., compared to traditional hang detection techniques), the hang buster can implement multiple tiers, where each tier is associated with one or more actions for breaking out of a hang condition, where the actions may be progressively more severe (in terms of impact on the operation of the processor) with each successive tier. For example, the hang buster can enter a first tier after a first hang detection threshold has passed. The first tier may use a first hang detection counter with a first hang detection threshold set to a value that enables the processor to break out of hang condition early (compared to traditional techniques) due to lack of forward progress. For example, in one embodiment, the first hang detection threshold can be set on the order of thousand of cycles, as opposed to millions of cycles. By using a first tier to enable early detection of hang conditions, the multi-tier hang buster can prevent the processor from waiting a long time before taking action(s) to break out of the hang condition.

Once the first hang detection threshold has passed, the hang buster can perform at the first tier one or more actions to attempt to break out of the hang condition. In one embodiment, the one or more actions at the first tier may be low severity actions that have limited impact on operation of the processor (e.g., such as current execution of instructions). For example, the actions at the first tier can include a block issue, issue shuffle, issue in-order, etc. The actions at the first tier may be less severe than other actions, such as an issue throttle, NTC flush, etc., associated with higher level tiers.

If the actions at the first tier are not successful (e.g., the actions could not break out of the hang condition), the hang buster can escalate from the first tier to a higher (e.g., second) tier. For example, the hang buster can use at the higher tier a hang detection counter set to another hang detection threshold to escalate to subsequent higher tiers. Once the hang detection threshold at the higher (e.g., second tier) has passed, the hang buster can perform at the second tier another set of actions to attempt to break out of the hang condition. The actions at the second tier may be more severe (e.g., have a greater impact on the operation of the processor) than the actions at the first tier and less severe than actions associated at higher tiers. For example, the actions at the second tier can include an issue throttle, issue serialize, dispatch flush, etc.

If the actions at the second tier are not successful, the hang buster can escalate from the second tier to a higher (e.g., third) tier and perform a set of actions associated with the third tier to attempt to break out of the hang condition. In general, if the actions of a lower tier hang buster are not effective, then the hang buster can escalate the hang buster to higher tiers, which perform other types of hang buster actions. If the highest tier of the hang buster still cannot break out of the hang condition, then the hang buster can give control back to the processor core to perform a flush action. In this manner, the multi-tier hang buster described herein provides the processor a pro-active and more efficient mechanism to monitor and start hang buster much earlier than traditional hang detection techniques.

Note, to clearly point out novel features of the present invention, the following discussion omits or only briefly describes conventional features of information processing systems which are apparent to those skilled in the art. It is assumed that those skilled in the art are familiar with the general architecture of processors, and in particular with processors which operate in an in-order dispatch, out-of-order execution, in-order completion fashion.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Figure 1:
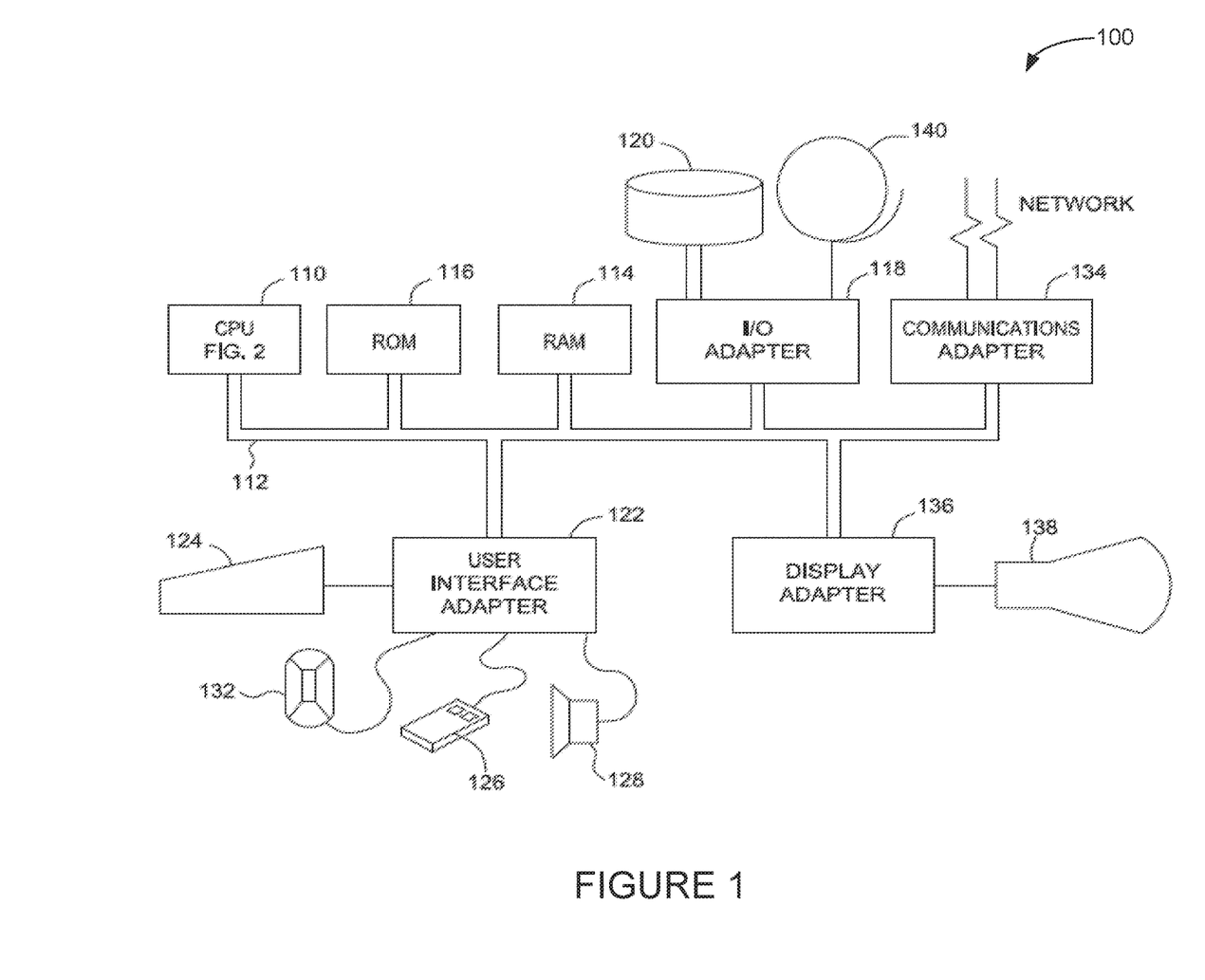
FIG. 1 illustrates an example of a data processing system configured to use one or more multi-tier hang buster components for detecting and breaking out of hang conditions, according to one embodiment, according to one embodiment.

FIG. 1 illustrates an example of a data processing system 100 that may include one or more multi-tier hang buster components for detecting and breaking out of hang conditions, according to one embodiment. The system has a central processing unit (CPU) 110 such as a PowerPC microprocessor ("PowerPC" is a trademark of IBM Corporation). The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and operates according to reduced instruction set computing ("RISC") techniques. The CPU 110 processes according to processor cycles, synchronized, in some aspects, to an internal clock (not shown).

Figure 2:
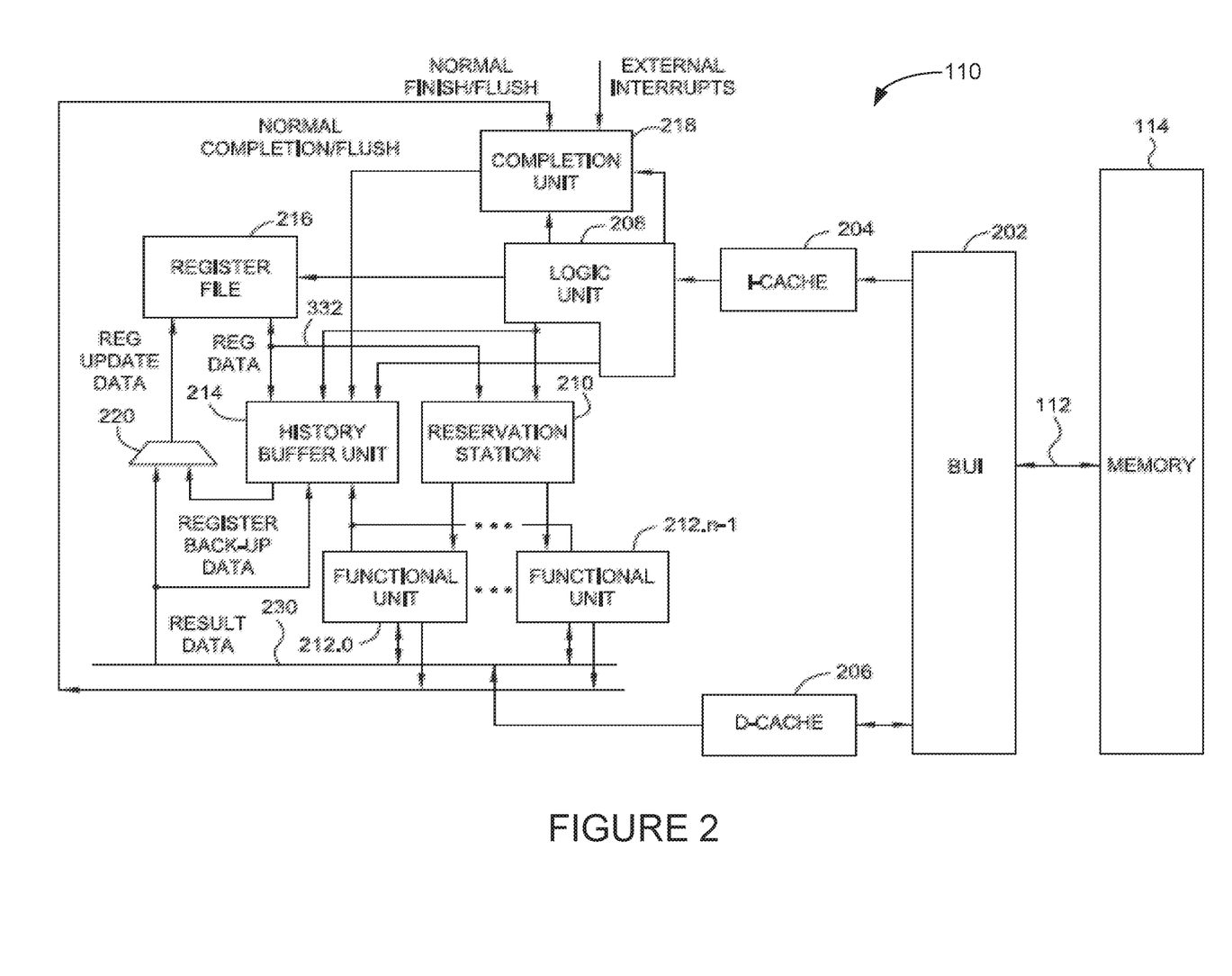
FIG. 2 illustrates a block diagram of a processor that includes one or more multi-tier hang buster components, according to one embodiment.

FIG. 2 illustrates a block diagram of a processor 110 that may include a multi-tiered hang buster for detecting and breaking out of hang conditions, according to one embodiment. Processor 110 has a bus interface unit 202 coupled to the bus 112 for controlling transfers of data and instructions between memory, such as random access memory 114, and caches, e.g. instruction cache (I-Cache) 204 and data cache (D-Cache) 206. Processor 110 may be configured to operate in single threaded (ST) mode or simultaneous multi-threaded (SMT) mode.

Instructions may be processed in the processor 110 in a sequence of logical, pipelined stages. However, it should be understood that the functions of these stages, may be merged together, so that this particular division of stages should not be taken as a limitation, unless such a limitation is indicated in the claims herein. Indeed, some of the previously described stages are indicated as a single logic unit 208 in FIG. 2 for the sake of simplicity of understanding and because each distinction between stages is not necessarily central to the present invention.

Logic unit 208 in FIG. 2 includes fetch, branch processing, instruction buffer, decode and dispatch units. The unit 208 fetches instructions from instruction cache 204 into the instruction buffer, either based on a normal sequence of the instructions or, in the case of a sequence having a conditional branch instruction, a predicted sequence, the predicted sequence being in accordance with addresses selected by the branch processing unit. The logic unit 208 also decodes the instructions and dispatches them to an appropriate functional unit (e.g., execution unit) 212.0, 212.1, . . . 212.n−1 via reservation station 210. In one embodiment, logic unit 208 may include an instruction sequencing unit (ISU) (not shown) for dispatching the instructions to the appropriate functional units. In executing the instructions, the units 212 input and output information to registers (shown collectively as register file (RF) 216). The functional units 212 signal the completion unit 218 upon execution of instructions and the completion unit 218 retires the instructions, which includes notifying history buffer (HB) logic 214. The HB 214 may save a processor state before, for example, an interruptible instruction, so that if an interrupt occurs, HB control logic may recover the processor state to the interrupt point by restoring the content of registers.

Logic unit 208 may also include a multi-tier hang buster component for detecting and breaking out of hang conditions. In one embodiment, the multi-tier hang buster component may be within the ISU. The multi-tier hang buster component may monitor the completion unit 218 in order to detect whether there is a hang condition on one or more threads in processor 110. For example, the completion unit 218 may notify logic unit 208 after each instruction is retired or committed to the machine. The multi-tier hang buster component may include one or more hang detection counters (e.g., in each thread) for monitoring for hang conditions.

In one embodiment, the multi-tier hang buster component can configure the hang detection counters to monitor lack of forward progress on a current thread (e.g., the thread in which the counters are located). For example, the multi-tier hang buster component may reset the hang detection counters each time a completion signal is received from the completion unit 218. Otherwise, the multi-tier hang buster component may increment the counters every cycle that a completion signal is not received from the completion unit 218. In one embodiment, the multi-tier hang buster component can configure the hang detection counters to monitor the number of completions on other threads. For example, the multi-tier hang buster component can increment the counters each time that a completion signal is received from the completion unit 218 for the other threads.

The multi-tier hang buster component can be configured to perform, at each tier, different types of actions for breaking out of a hang condition. Starting with a first tier, the hang buster component may perform one or more low severity actions to attempt to break out of the hang condition. If the actions at the first tier are not effective, the multi-tier hang buster component can escalate to a higher tier and perform one or more actions that are more severe than the actions performed at the first tier. For example, the actions at the higher tier may have a greater impact on operation of the processor, such that the likelihood of breaking out of the hang condition is greater. The multi-tier hang buster component may continue to escalate to higher tiers in order to perform more severe actions, e.g., if the actions at the lower tiers are not successful. At the last (or highest) tier, the multi-tier hang buster component may attempt a flush action.

In some embodiments, a CPU 110 may have multiple execution/processing slices with each slice having one or more of the units shown in FIG. 2. For example, each processing slice may have its own logic unit 208, register file 216, history buffer 214, reservation station 210 and functional/execution units 212. A CPU 110 having the multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Each processing slice may be an independent processor (e.g., processor 110) and may execute instructions independently of other processing slices in the multi-slice processor.

Figure 3:
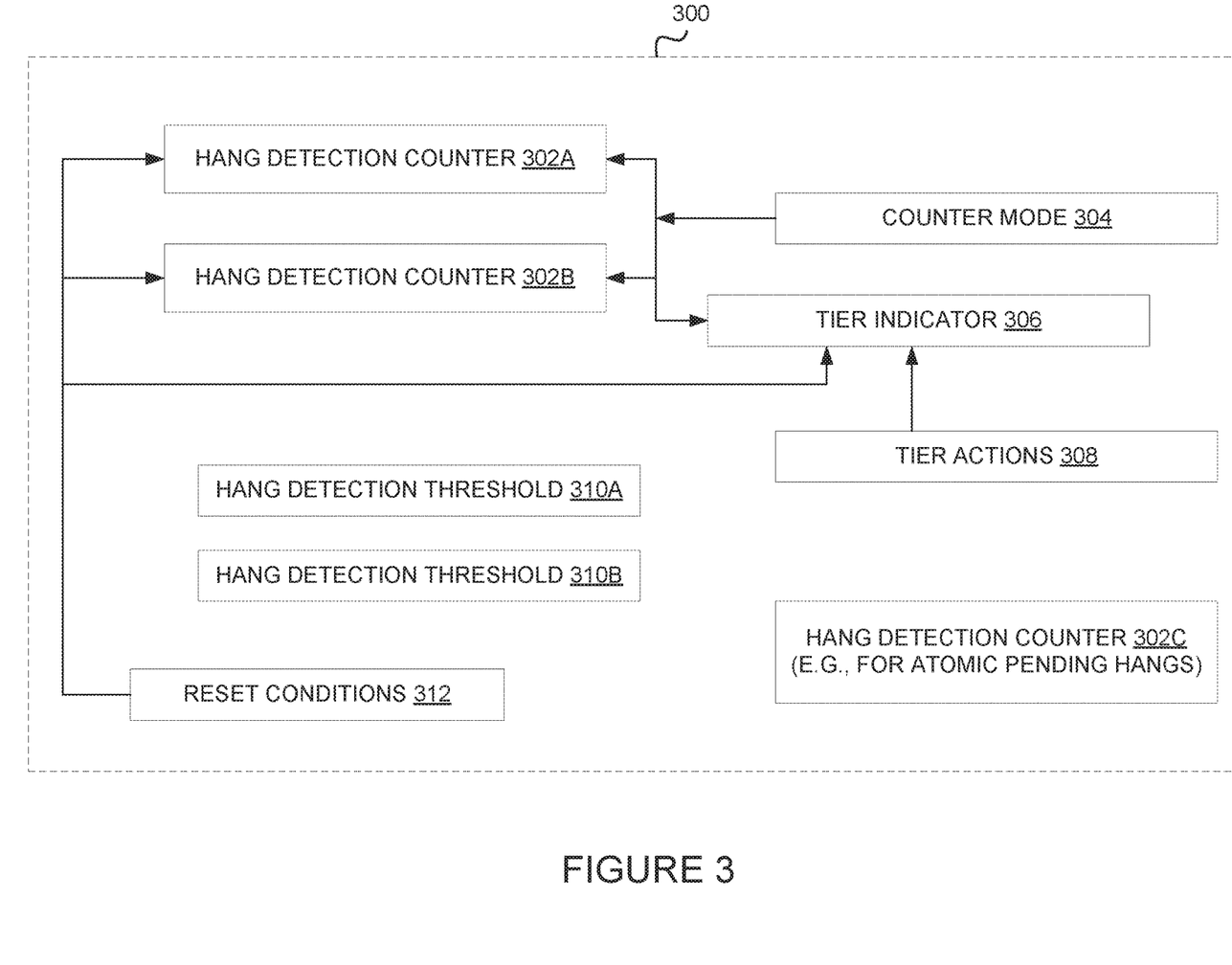
FIG. 3 illustrates a block diagram of an example multi-tier hang buster component, according to one embodiment.

FIG. 3 illustrates a multi-tier hang buster component 300 for detecting and breaking out of hang conditions in a processor (e.g., CPU 110), according to one embodiment. In one embodiment, each thread in the processor may include a multi-tier hang buster component 300.

As shown, the multi-tier hang buster component 300 may include one or more hang detection counters for monitoring for hang conditions in a thread. In this embodiment, the multi-tier hang buster component 300 includes hang detection counters 302A, 302B and 302C for each thread. Each counter 302A, 302B, 302C may be a 20 bit counter and may be implemented with one or more chip registers. In general, however, the counters 302 may be configured to have any number of bits.

In one embodiment, the multi-tier hang buster component 300 can configure each of the counters 302 in different modes per tier per thread. For example, at each tier of every thread, the multi-tier hang buster component 300 can configure, via counter mode 304, one or more of counters 302 to count in ST mode (e.g., counting the number of cycles since last completion on the current thread) or in SMT mode (e.g., counting the number of completions on other threads).

In one reference example, assuming the processor has four threads, T0, T1, T2 and T3, the multi-tier hang buster component 300 (e.g., for T0) may configure hang detection counter 302A to count the number of cycles since a last completion on T0, and configure hang detection counter 302B to count the number of completions on T1, T2 and T3. Using configurable separate modes per tier, per thread enables the multi-tier hang buster component 300 to increment a tier when a thread is hung in ST mode (e.g., hung due to some issue specific to the thread itself) and/or in live-lock out cases where other threads are making progress (e.g., and preventing progress on the current thread).

Additionally, or alternatively, in some embodiments, the multi-tier hang buster component 300 can configure each of the counters with separate thresholds, per mode, per tier. For example, the multi-tier hang buster component 300 can configure one or more of the counters 302 to use one hang detection threshold (e.g., hang detection threshold 310A) for the first tier, and another hang detection threshold (e.g., hang detection threshold 310B) for higher tiers. In this example, hang detection threshold 310A may be set to a lower timeout value (e.g., on the order of thousands of cycles) in order to enable the multi-tier hang buster to quickly detect a hang condition (e.g., compared to traditional hang detection techniques) and begin performing actions to break out of the hang condition. Hang detection threshold 310B may be set to a same or different timeout value.

Further, in some cases, the multi-tier hang buster component 300 can configure one or more of the counters 302 to use different thresholds based on the particular mode each counter is configured in. For example, assuming hang detection counter 302A (or another counter 302) is configured in ST mode, the hang detection counter 302A may use a hang detection threshold (e.g., hang detection threshold 310A) that is set to count a number of cycles (e.g., 1 million cycles). On the other hand, if hang detection counter 302A (or another counter 302) is configured in SMT mode, hang detection counter 302A may use a hang detection threshold that is set to count a number of completions (e.g., 100 thousand completions, which could take 1 million cycles). Using separate configurable thresholds enables the multi-tier hang buster component 300 to quickly detect live-lock cases (e.g., where T1-T3 are blocking T0) and/or quickly detect hang conditions on a single thread.

In some embodiments, each thread may also be configured with a separate hang detection counter (e.g., hang detection counter 302C) (per thread) for known atomic-pending hangs. Hang detection counter 302C may be used to detect hangs associated with partially dispatched instructions. In one embodiment, the hang detection counter 302C can monitor for completions on a thread designated as most favored ITAG (MFI) and trigger the multi-hang buster 300 to perform one or more actions to break out of a hang condition if counter 302C reaches a threshold.

The hang detection counters (e.g., counters 302A, 302B) may be reset based on one or more reset conditions 312. Reset conditions 312 may include, but are not limited to, a completion on a current thread, an overflow of the counter, performance of a tier or work around trigger (WAT) action, etc. Additionally, in some embodiments, special exceptions logic may trigger a reset of the hang detection counters 302. For example, in some cases, an interrupt, such as, for example, Cl load at tail (from sdcx), may cause the counter to meet one of the detection thresholds. Thus, to prevent triggering the hang buster in normal interrupt cases, the multi-tier hang buster 300 can reset the counters whenever a special exception occurs.

The multi-tier hang buster component 300 can use tier indicator 306 to indicate which tier the counters 302 are currently operating in and to escalate the hang buster component 300 to higher tiers. For example, in some embodiments, tier indicator 306 can use three bits to indicate the particular tier. Further, each tier may be configured with a set of tier actions 308. Table I shows a reference example of tier actions 308 that can be configured a multi-tier hang buster component 300 with 8 tiers. Note, however, that the multi-tier hang buster component 300 can be configured with any number of tiers. Additionally, while Table I shows particular actions associated with particular tiers, one or more of the actions may be implemented in any tier of the multi-tier hang buster component 300.

TABLE I

EXAMPLE ACTIONS FOR EACH OF TIER OF MULTI-TIER HANG BUSTER

| TIER | ACTION | TARGET | DESCRIPTION |
|---|---|---|---|
| 0 | Block Issue | Other threads | Only issue "hung" thread |
| 0 | Issue Shuffle | Current thread, all threads | Randomize issue |
| 0 | Issue In-Order | Current thread | Issue oldest first regardless of ready |
| 1 | Issue Throttle | All threads | Issue 1 op per n cycles |
| 1 | Issue Serialize | All threads | Set NTC issue, issue 1 and wait for ICT |
| 1 | Dispatch Flush | All threads | Flush dispatch queues (ops not in ICT) |
| 2 | Disable LHS | Current thread | Disable load hit store (LHS) table to prevent potential hang |
| 3 | Dispatch Throttle | | Issue 1 ppc, per n-cycles |
| 3 | NTC + 1 Flush | Current thread, other threads, all threads | Flush request |
| 4 | Dispatch Serialize | All threads | Issue 1 ppc, wait till ICT is empty |
| 5 | NTC Flush | Current thread, other threads, all threads | Flush request |
| 6 | Refetch single PPC | All threads | IFU to transmit max of 1 ppc per cycle |
| 7 | NOP/Nothing | | Do nothing, observe hang |

In some embodiments, the multi-tier hang buster 300 can use one or more chicken switches (also referred to as scan initialized latches, disable switches, back-off mode switches, mode latches) to perform the tier actions, configure the counter modes, configure the hang detection threshold values, etc. Each chicken switch (or scan initialized latch) in general can act as a switch, holding an assigned state value, to modify functionality by enabling or disabling circuitry within the processor. In one embodiment, the multi-tier hang buster 300 can use a chicken switch for counter mode 304, chicken switches to determine the tiers 306, chicken switches for each hang detection threshold 310, and one or more chicken switches for tier actions 308. In some embodiments, the multi-tier hang buster 300 can also be triggered by a WAT. For example, the multi-tier hang buster 300 can use a WAT to determine/escalate the tier of the multi-tier hang buster, perform the tier actions 308, etc. Note that FIG. 3 illustrates merely one reference example of a configuration of a multi-level hang buster that may be included within each thread of a processor. Those of ordinary skill in the art will recognize that the multi-level hang buster described herein may include any number of hang detection counters, hang detection thresholds, tiers, etc.

Figure 4:
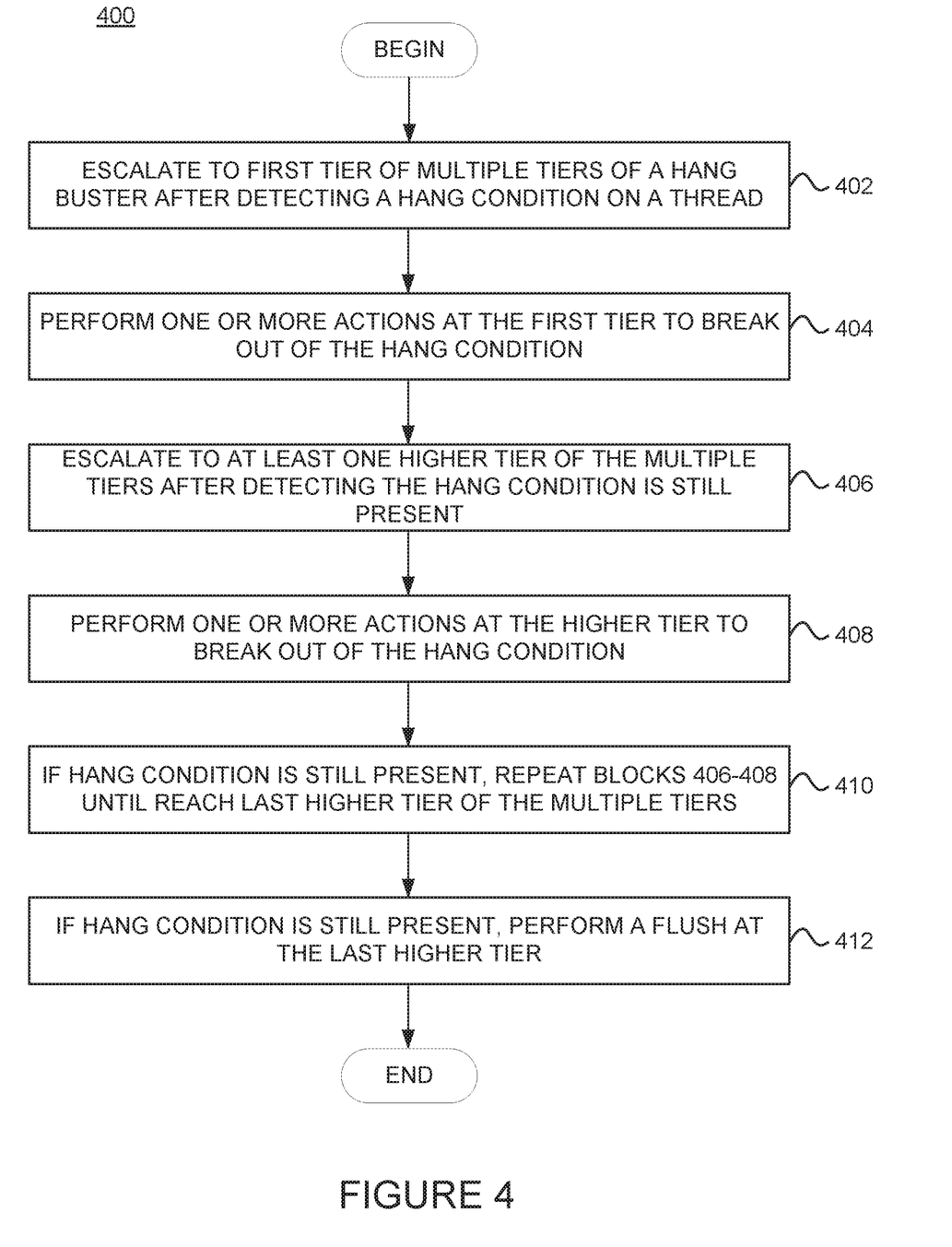
FIG. 4 is a flow chart illustrating a method for using a multi-tier hang buster component for detecting and breaking out of a hang condition in a processing unit, according to one embodiment.

FIG. 4 is a flow chart illustrating a method 400 for using a multi-tier hang buster for detecting and breaking out of a hang condition in a processing unit, according to one embodiment. The method 400 can be performed by a processing unit (e.g., CPU 110) or one or more components (e.g., logic unit 208, ISU, multi-tier hang buster 300) of the processing unit. In some embodiments, assuming the processing unit is operating in SMT mode, each thread may perform method 400.

As shown, the method 400 begins at block 402, where the processing unit escalates to a first tier of multiple tiers of a hang buster after detecting a hang condition on a thread. As noted, in some embodiments, the processing unit may use a hang detection counter (e.g., hang detection counter 302) set to a low timeout value/threshold (e.g., on the order of thousands of cycles as opposed to millions of cycles) to enable early detection of a hang condition. The hang detection counter may count a number of cycles since a last completion on the thread (e.g., T0) (e.g., if configured in ST mode) or may count the completions on one or more other threads (e.g., T1-T3) (e.g., if configured in SMT mode). Once the hang detection counter reaches the threshold, the processing unit may trigger the multi-tier hang buster to attempt to break out of the hang condition by escalating to the first tier of the multiple tiers of the hang buster.

At block 404, the processing unit performs one or more actions at the first tier to break out of the hang condition. In one embodiment, the one or more actions at the first tier may be low severity actions (e.g., compared to actions associated with higher tiers). As used herein, "severity" may refer to the impact the actions have on one or more of memory, processor speed/load, efficiency, etc., operation of the processing unit. As one reference example, the processing unit may perform a "block issue" and/or "issue shuffle" at the first tier to break out of the hang condition, instead of "disable LHS" or "flush request," which may have greater impact on the operation of the processing unit.

If successful, performing such low severity actions at the first tier can enable the processing unit to break out of a hang condition much earlier than traditional techniques, while at the same time limiting the impact to the operation of the processor. As described below, the processing unit may continue to increase the severity of actions performed at each subsequent higher tier (assuming the hang condition is still present), and in turn increasing the impact to the processor, until the processing unit is able to break out of the hang condition. In some cases, the processing unit may reset one or more of the hang detection counters at the first tier after performing an action. In some embodiments, the processing unit may pre-determine (e.g., based on previous operation(s)) for each action an estimated amount of impact the action is likely to have on the operation of the processor. The processing unit may then associate the actions into the hang buster tiers based on their estimated impact. That is, referring to the reference example in Table I, the processing unit may determine that the actions associated with Tier 0 have an estimated "severity" below a first pre-determined threshold, the actions associated with Tier 1 have an estimated "severity" below a second pre-determined threshold and above the first threshold, and so on.

At block 406, the processing unit escalates to at least one higher tier of the multiple tiers of the hang buster after detecting that the hang condition is still present. For example, after the processing unit performs the actions at the first tier, the processing unit may escalate to a higher tier based on one of the hang detection counters reaching a particular timeout value/threshold associated with the respective higher tier. In one embodiment, the hang detection counter associated with the higher tier may be set to a different timeout value than the first (or lower tier). In one embodiment, the hang detection counter associated with the higher tier may be set to a different mode (e.g., ST or SMT mode) than the hang detection counter at the first or lower tier.

At block 408, the processing unit performs one or more actions at the higher tier to break out of the hang condition. As noted, the actions performed at the higher tier may be more "severe" or have a greater impact on the operation of the processor, compared to actions performed at lower tier(s). As one reference example, assuming the higher tier is tier 1 (e.g., second tier of multiple tiers), the processing unit may attempt to "issue throttle" as opposed to "issue shuffle". However, note that this is merely a reference example, and that those of ordinary skill in the art will recognize that, in some cases, depending on the architecture, the processing unit may determine that "issue shuffle" is more "severe" than "issue throttle," and should therefore be associated with a higher tier.

At block 410, if the processing unit detects the hang condition is still present (e.g., based on one or more of the hang detection counters), the processing unit repeats the operations in blocks 406 and 408 for each tier of the multiple tier until the last higher tier of the multiple tiers is reached. If the hang condition is still present at the last tier, the processing unit may perform the highest "severity" action to break out of the hang condition. For example, in one embodiment, at block 412, the processing unit performs a flush operation (e.g., of all threads). However, in other embodiments, the processing unit may perform other actions. If the hang condition is still present after performing the actions on the last tier, the processing unit may stay in a hang state, declare a failure, go back to the first tier and repeat the actions at each tier, etc.

As such, the multi-tier hang buster described herein enables a processing unit to more proactively (e.g., compared to traditional techniques) monitor and detect for hang conditions, and once detected, enables the processing unit to break out of the hang condition with limited impact to the operation of the processor.

In some cases, when operating in SMT mode, there may be situations in which the hang buster actions performed by one thread (e.g., T0) interfere with the hang buster activities on one or more other threads (e.g., T1-T3). Consider the following example, in which T0 requests a flush of T2. Assume that as a result of T0's action, T2 times out and subsequently requests a flush of T0. T0 then times out, requests a flush of T2, and the process continually repeats. Further, consider another example, in which T0 requests a flush of T1, T2 and T3, followed shortly by T1 requesting a flush of T0, T2 and T3. In both of these examples, the "hung" thread(s) actions collide with each other, and may significantly impact operation of the processor.

Accordingly, embodiments may address the above problem by configuring the processing unit (e.g., CPU 110 with a hang buster arbiter that monitors the multi-tier hang buster (e.g., multi-tier hang buster 300) in each thread. Based on the monitoring, the hang buster arbiter may take actions to prevent collisions between actions performed by different threads. In some cases, the hang buster arbiter may determine whether to allow a thread to perform an action that impacts another thread's operation based on one or more conditions.

For example, in some cases, the one or more conditions may include the last thread to request a flush. If, for example, T0 was the last thread to request a flush, the hang buster arbiter may prevent one or more other threads (e.g., T1-T3) from requesting a flush of T0 for x number of cycles (or a predetermined amount of time) and/or prevent T0 from requesting another flush of one or more threads for x number of cycles. In some cases, the one or more conditions may include the current tier for all threads. For example, the hang buster arbiter may give priority to threads that are in higher tiers. In some cases, the one or more conditions may include whether any threads have completed since a flush operation (e.g., each thread may be counting other threads completions). In some cases, the one or more conditions may include whether the hang detection counters were reset after the flush operation. In some cases, the hang buster arbiter can establish a configurable window after T0 flushes another thread, such that the other thread (e.g., T1) cannot flush T0. T0 may still, however, be able to flush T2, T3, etc.

Figure 5:
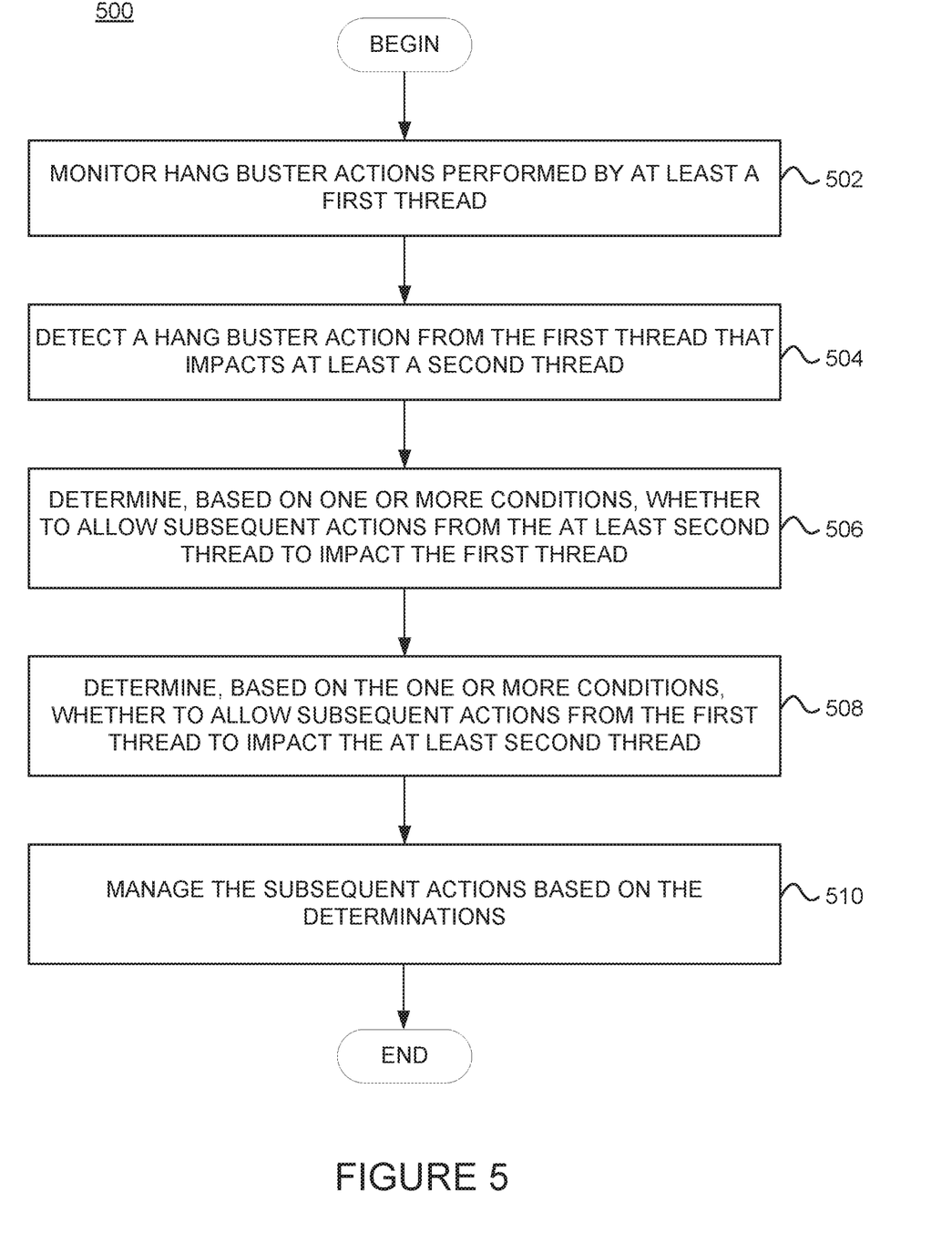
FIG. 5 is a flow chart illustrating a method for using a multi-tier hang buster arbiter for coordinating hang buster actions among threads in a processing unit, according to one embodiment.

FIG. 5 is a flow chart illustrating a method 500 for using a multi-tier hang buster arbiter for coordinating hang buster actions among threads in a processing unit, according to one embodiment. The method 500 can be performed by a processing unit (e.g., CPU 110) or one or more components (e.g., logic unit 208) of the processing unit.

As shown, the method 500 begins at block 502, where the processing unit monitors hang buster actions performed by at least a first thread. At block 504, the processing unit detects (e.g., based on the monitoring) a hang buster action from the first thread that impacts at least a second thread. For example, the first thread may have requested a flush of one or more second threads.

At block 506, the processing unit determines, based on one or more conditions, whether to allow subsequent actions from the at least second thread to impact the first thread. At block 508, the processing unit determines, based on the one or more conditions, whether to allow subsequent actions from the first thread to impact the at least second thread. As noted, the one or more conditions can include at least one of a last thread to request a flush, current tier for each thread, whether any thread completed since a previous action (e.g., a flush) impacted that thread, whether the hang detection counters on the threads were reset after a previous action impacted the threads, etc.

At block 510, the processing unit manages the subsequent actions based on the determinations (e.g., in blocks 506, 508). For example, in some cases, the processing unit may determine to allow the subsequent actions based on the determinations. In some cases, the processing unit may determine to prevent the subsequent actions for a period of time based on the determinations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for breaking out of a hang condition in a processor, comprising:
   determining a first plurality of actions available at each of a plurality of tiers used for breaking out of the hang condition in the processor;
   after detecting the hang condition on a first thread of the processor, performing one or more actions available at a first tier of the plurality of tiers to break out of the hang condition;
   after performing the one or more actions at the first tier and determining that the hang condition is still present, performing one or more actions available at one or more second tiers of the plurality of tiers to break out of the hang condition; and
   upon reaching a last tier of the plurality of tiers after performing the one or more actions at the first tier and performing the one or more actions at the one or more second tiers:
      determining that the hang condition is still present; and
      performing a flush operation to break out of the hang condition, wherein the flush operation is one of the first plurality of actions and is performed at an initial time at the last tier of the plurality of tiers in order to break out of the hang condition.

2. The computer-implemented method of claim 1, wherein detecting the hang condition comprises:
   monitoring an amount of time that has elapsed since a previous completion on the first thread; and
   determining that the amount of time that has elapsed since the previous completion on the first thread is above a threshold.

3. The computer-implemented method of claim 1, wherein detecting the hang condition comprises:
   monitoring a number of completions on at least a second thread in the processor; and
   determining that the number of completions on the at least a second thread in the processor is above a threshold.

4. The computer-implemented method of claim 1, wherein the one or more actions available at the one or more second tiers have a greater impact on operation of the processor than the one or more actions available at the first tier, wherein the impact on the operation of the processor comprises at least one of impact to memory, load, and speed of the processor.

5. The computer-implemented method of claim 1, further comprising:
   detecting that at least one of the first plurality of actions performed by the first thread impacts at least a second thread in the processor;
   determining, based on one or more conditions, at least one of whether to allow subsequent actions from the at least second thread to impact the first thread and whether to allow subsequent actions from the first thread to impact the at least second thread; and
   managing the subsequent actions from the first thread at the at least second thread based on the determination of whether to allow the subsequent actions.

6. The computer-implemented method of claim 5, wherein the one or more conditions comprise at least one of whether the first thread was a last thread to request a flush, a current tier on each of the first thread and at least second thread, and whether there was a completion on the first thread or at least second thread after a flush operation.

7. A system, comprising:
   at least one processor; and
   a memory storing a program, which, when executed on the at least one processor, perform an operation for breaking out of a hang condition in the processor, the operation comprising:
   determining a first plurality of actions available at each of a plurality of tiers used for breaking out of the hang condition in the processor;
   after detecting the hang condition on a first thread of the processor, performing one or more actions available at a first tier of the plurality of tiers to break out of the hang condition;
   after performing the one or more actions at the first tier and determining that the hang condition is still present, performing one or more actions available at one or more second tiers of the plurality of tiers to break out of the hang condition; and
   upon reaching a last tier of the plurality of tiers after performing the one or more actions at the first tier and performing the one or more actions at the one or more second tiers:
      determining that the hang condition is still present; and
      performing a flush operation to break out of the hang condition, wherein the flush operation is one of the first plurality of actions and is performed at an initial time at the last tier of the plurality of tiers in order to break out of the hang condition.

8. The system of claim 7, wherein detecting the hang condition comprises:
   monitoring an amount of time that has elapsed since a previous completion on the first thread; and
   determining that the amount of time that has elapsed since the previous completion on the first thread is above a threshold.

9. The system of claim 7, wherein detecting the hang condition comprises:
   monitoring a number of completions on at least a second thread in the processor; and
   determining that the number of completions on the at least a second thread in the processor is above a threshold.

10. The system of claim 7, wherein the one or more actions available at the one or more second tiers have a greater impact on operation of the processor than the one or more actions available at the first tier, wherein the impact on the operation of the processor comprises at least one of impact to memory, load, and speed of the processor.

11. The system of claim 7, the operation further comprising:
   detecting that at least one of the first plurality of actions performed by the first thread impacts at least a second thread in the processor;

determining, based on one or more conditions, at least one of whether to allow subsequent actions from the at least second thread to impact the first thread and whether to allow subsequent actions from the first thread to impact the at least second thread; and managing the subsequent actions from the first thread at the at least second thread based on the determination of whether to allow the subsequent actions.

12. The system of claim 11, wherein the one or more conditions comprise at least one of whether the first thread was a last thread to request a flush, a current tier on each of the first thread and at least second thread, and whether there was a completion on the first thread or at least second thread after a flush operation.

13. A computer program product, the computer program product comprising:

a computer-readable storage medium having computer-readable program code embodied therewith, the computer-readable program code executable by one or more computer processors to perform an operation for breaking out of a hang condition in a processing unit, the operation comprising:

determining a first plurality of actions available at each of a plurality of tiers used for breaking out of the hang condition in the processing unit;

after detecting the hang condition on a first thread of the processor, performing one or more actions available at a first tier of the plurality of tiers to break out of the hang condition;

after performing the one or more actions at the first tier and determining that the hang condition is still present, performing one or more actions available at one or more second tiers of the plurality of tiers to break out of the hang condition; and upon reaching a last tier of the plurality of tiers after performing the one or more actions at the first tier and performing the one or more actions at the one or more second tiers:

determining that the hang condition is still present; and performing a flush operation to break out of the hang condition, wherein the flush operation is one of the first plurality of actions and is performed at an initial time at the last tier of the plurality of tiers in order to break out of the hang condition.

14. The computer program product of claim 13, wherein detecting the hang condition comprises:

monitoring an amount of time that has elapsed since a previous completion on the first thread; and determining that the amount of time that has elapsed since the previous completion on the first thread is above a threshold.

15. The computer program product of claim 13, wherein detecting the hang condition comprises:

monitoring a number of completions on at least a second thread in the processing unit; and determining that the number of completions on the at least a second thread in the processing unit is above a threshold.

16. The computer program product of claim 13, wherein the one or more actions available at the one or more second tiers have a greater impact on operation of the processing unit than the one or more actions available at the first tier, wherein the impact on the operation of the processing unit comprises at least one of impact to memory, load, and speed of the processing unit.

17. The computer program product of claim 13, the operation further comprising:

detecting that at least one of the first plurality of actions performed by the first thread impacts at least a second thread in the processing unit;

determining, based on one or more conditions, at least one of whether to allow subsequent actions from the at least second thread to impact the first thread and whether to allow subsequent actions from the first thread to impact the at least second thread; and managing the subsequent actions from the first thread at the at least second thread based on the determination of whether to allow the subsequent actions.

18. The computer program product of claim 17, wherein the one or more conditions comprise at least one of whether the first thread was a last thread to request a flush, a current tier on each of the first thread and at least second thread, and whether there was a completion on the first thread or at least second thread after a flush operation.

* * * * *